C. H. MANSFIELD.
FILM WINDER FOR CAMERAS.
APPLICATION FILED APR. 6, 1916.

1,226,681.

Patented May 22, 1917.
2 SHEETS—SHEET 1.

WITNESS
C. P. Ellis

INVENTOR
C. H. Mansfield
BY
John M. Spellman
ATTORNEY

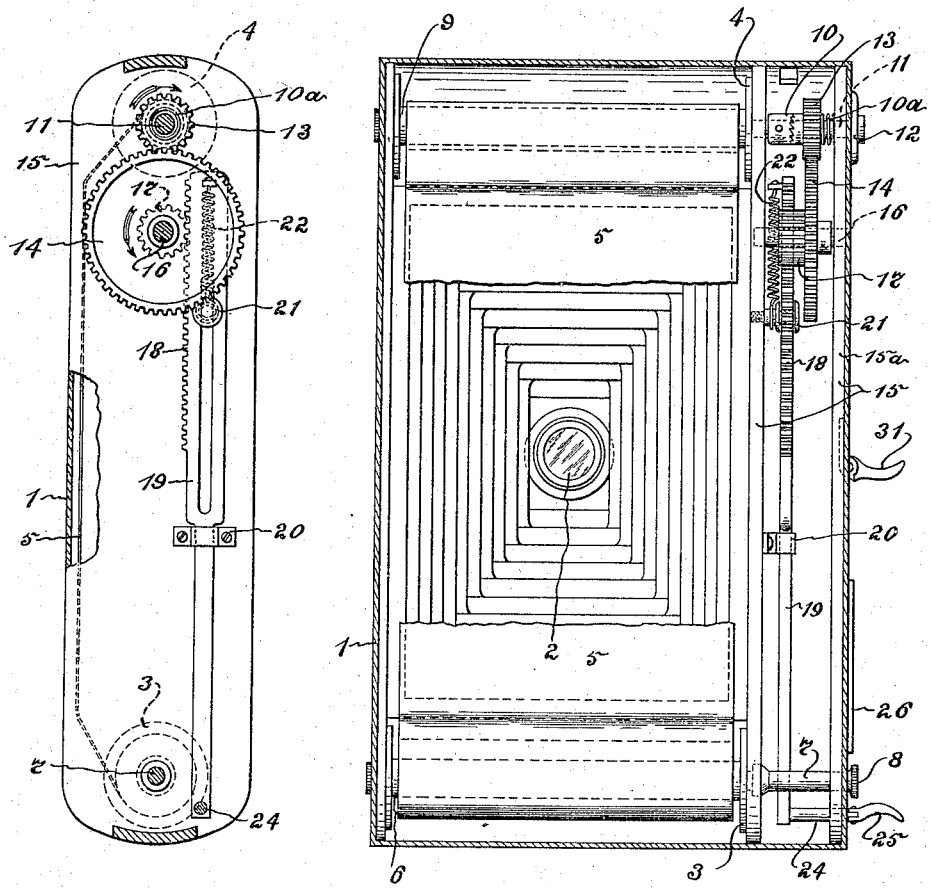

UNITED STATES PATENT OFFICE.

CLARENCE H. MANSFIELD, OF EL PASO, TEXAS.

FILM-WINDER FOR CAMERAS.

1,226,681.      Specification of Letters Patent.      Patented May 22, 1917.

Application filed April 6, 1916. Serial No. 89,407.

*To all whom it may concern:*

Be it known that I, CLARENCE H. MANSFIELD, a citizen of the United States, residing at El Paso, in the county of El Paso and State of Texas, have invented certain new and useful Improvements in Film-Winders for Cameras, of which the following is a specification.

My invention has relation to an attachment for film cameras and in such connection it relates more particularly to means constituting such an attachment whereby the required portion of the film may be drawn to position across the lens of the camera.

In film cameras as heretofore constructed, the unexposed film, wound up into a roll, is placed upon one spool with a free end attached to a second spool and by winding up the second spool the film is drawn across the lens for successive exposures. It is obvious that inasmuch as the film is wound up on the second spool the diameter of said spool increases whereas the diameter of the first spool correspondingly decreases. It follows therefore that in winding up of the second spool care must be exercised in the number of turns given the spool since otherwise the required portion of the film to be exposed will not register properly across the lens of the camera.

It is the main object of my present invention to provide an attachment or device for film cameras whereby the requisite amount of film may be wound up to bring the required portion of the film in exact register across the lens of the camera.

In the carrying out of my invention I provide a means connected with the axis of the second spool whereby said axis may be turned a distance indicated and limited by a scale which scale may also serve as an indicator to show the number of the film to be exposed. This device may be located within the camera casing to constitute a part of the camera or it may be attached to the exterior of the casing of the camera.

The nature and scope of my invention will be more fully understood from the following description taken in connection with the accompanying drawings, forming part hereof, in which—

Fig. 3, is a cross-sectional view taken on the line 3—3 of Fig. 1.

Fig. 4, is a vertical sectional view of a camera embodying a modified form of the invention.

Figure 1:
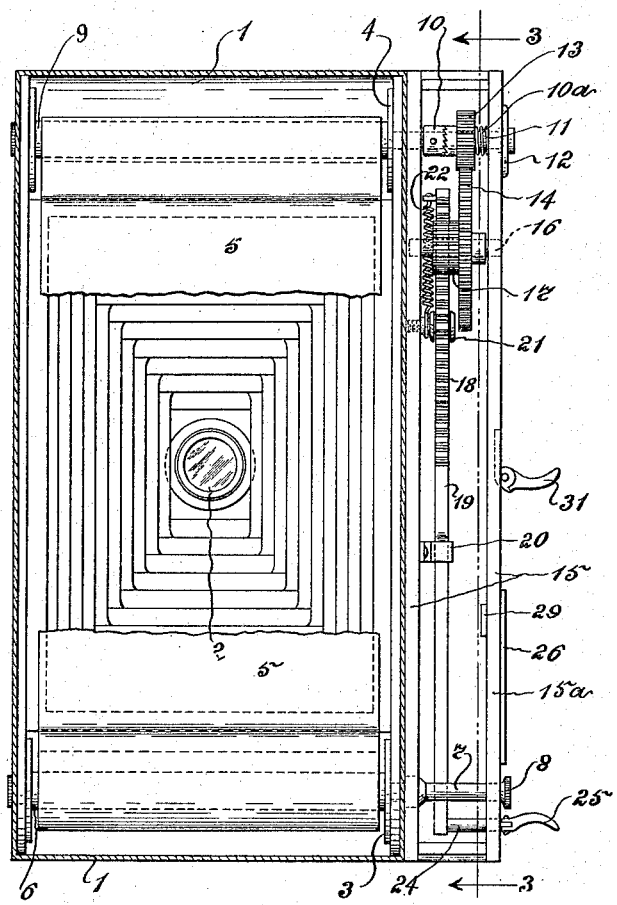
Figure 1, is a vertical sectional view of a film camera embodying the main features of my invention, the film being partly broken away.

Referring to the drawings; 1 represents the casing for the camera, 2 the lens and 3 and 4 the spools from and upon which the film 5 is unwound and wound in the presentation of successive portions of said film to the lens 2.

Figure 2:
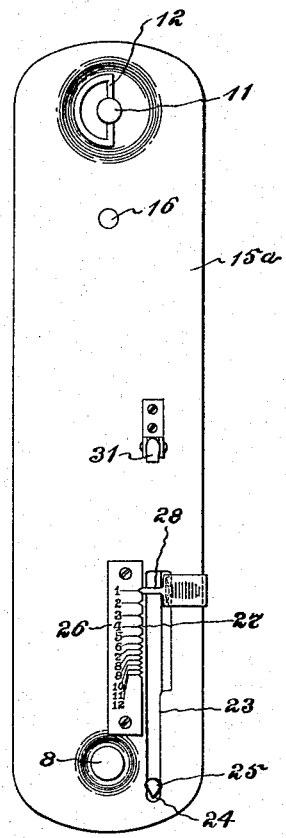
Fig. 2, is a side elevational view of the same.
Figure 5:
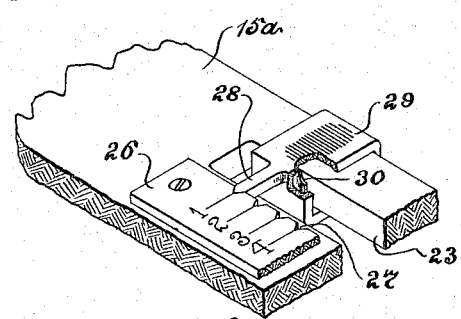
Fig. 5, is a detail perspective view of the scale for indicating and limiting the movement of the film winding mechanism.

The spool 3 which receives the unexposed film is of the usual character but has its axis 6 extended, in the form of the invention indicated in Figs. 1 to 3, beyond one side of the casing in the form of a stub shaft 7 furnished with a knurled button 8 for operating said shaft 7 and axis 6.

The spool 4 which receives the film after exposure to the lens 2 is also of the usual character except that in Figs. 1 to 3 its axis 9 is extended from one side of the camera in the form of a clutch or ratchet 10 connecting the axis 9 with a stub shaft 11 operated by the turn button 12.

On the stub shaft 11 is placed a pinion 13 meshing with a gear 14. The extensions of axis 6 and of axis 9 have a bearing in a box 15 which incloses the operating mechanism for gear 14 and pinion 13. The gear 14 has a shaft 16 turning in the side walls of box 15 and on shaft 16 is secured a pinion 17 meshing with a rack 18 carried by a bar 19. The rack 18 and bar 19 are guided in guideways 20 and 21. A spring 22 connects the top of rack 18 with the upper guide 21 and serves normally to lower the rack and bar.

The outer face 15ª of box 15 is slotted as at 23 and through this slot 23 extends a pin 24 connected rigidly at one end to the lower portion of rack bar 19. The free end of the pin 24 is hook shaped as at 25, the hook 25 extending beyond the front wall 15ª of the box 15. Adjacent to one edge of the slot 23 is a scale 26, having its inner edge notched as at 27 and bearing in its face a series of numbers corresponding to the number of exposures to the film which usually is twelve. It will be understood that the distances on the scale from one to two, two to three, etc., gradually decrease as clearly shown in Fig. 2.

Sliding on the edge of the slot 23 opposite the scale 26 is a pointer 28 carried by a bracket 29 which may slide under tension of a leaf spring 30 up and down upon the face 15$^a$ of box 15 along the edge of slot 23. The finger or pointer 28, when bracket 29 is manipulated, may enter successive notches 27 to not only constitute a means for indicating the number of the film to be exposed but also to constitute a stop to limit the movement of pin 24 and its hook 25 upward in said slot 23.

Above the slot 23 and on the plate 15$^a$ is arranged a second hook 31 arranged so that when the two hooks 31 and 25 are grasped between the fingers, the hook 25 and pin 24 are drawn upward toward hook 31, thus advancing bar 19 and rack 18 against the tension of spring 22. The extent of the movement upward of the rack bar 19 and the consequent extent of turning of the axis 9 of the wind-up spool 4 through gears and stub shaft 11 is limited by the position of pointer or indicator finger 28. When the hook 25 is released the spring 22 returns the bar 19 to its normal position.

The return of rack bar 19 to normal position causes a reverse movement of the pinion 17, shaft 16, gear 14, pinion 13, but no motion is conveyed to spool 4 since the clutch or ratchet 10 is so arranged as to permit of engagement of stub shaft 11 with the axis 9 only when the shaft 11 is moved in one direction. To assist the clutch in its operation the usual spring 10$^a$ is provided.

It is obvious that as more and more film is wound upon spool 4 and its diameter becomes larger the axis 9 must be turned less and less to wind a required portion of the film upon the spool. This graduated movement of axis 9 and spool 4 is secured by graduating the scale 26, so far as the distance between notches is concerned, as hereinabove set forth.

In Fig. 4 the construction and arrangement of parts is the same with the exception that the casing 1 is extended to inclose the box 15. In this arrangement the scale 26 is located on the outside of the casing and arranged thereon in any suitable manner.

Having thus described the nature and objects of my invention what I claim as new and desire to secure by Letters Patent, is—

1. In a film winding attachment, a spool upon which the exposed portions of the film are to be wound, a gear mechanism for driving said spool in one direction, a rack bar in mesh with one of the gears of said mechanism, an operating pin secured to the rack bar and projecting beyond the camera casing, a movable stop arranged to limit successive movements of the operating pin and rack bar and a scale in proximity to the movable stop, said scale indicating the successive positions of the stop.

2. In a film winding attachment for cameras, a spool for receiving the exposed films, a gear wheel controlling the movement of said spool, a rack and bar in mesh with said gear wheel, an operating pin secured to the rack bar and projecting beyond the camera casing, a slotted scale positioned adjacent to said pin and a movable indicator sliding on said scale and serving to limit the movement of the pin in said scale.

In testimony whereof I have signed my name to this specification in the presence of two subscribing witnesses.

CLARENCE H. MANSFIELD.

Witnesses:
 WILLIAM S. MOREHEAD,
 J. EDWIN CAWTHON.

Copies of this patent may be obtained for five cents each, by addressing the "Commissioner of Patents, Washington, D. C."